United States Patent
Han et al.

(10) Patent No.: US 8,395,729 B2
(45) Date of Patent: Mar. 12, 2013

(54) LIQUID CRYSTAL DISPLAY DEVICE

(75) Inventors: Sang Hun Han, Gunpo-si (KR); Joong Min Yoon, Paju-si (KR); Young Hoon Kim, Goyang-si (KR); Ho Chun Lee, Gumi-si (KR); Seung Hoon Ji, Jinhae-si (KR)

(73) Assignee: LG Display Co., Ltd., Seoul (KR)

( * ) Notice: Subject to any disclaimer, the term of this patent is extended or adjusted under 35 U.S.C. 154(b) by 326 days.

(21) Appl. No.: 12/853,184

(22) Filed: Aug. 9, 2010

(65) Prior Publication Data

US 2011/0149213 A1    Jun. 23, 2011

(30) Foreign Application Priority Data

Dec. 21, 2009 (KR) ........................ 10-2009-0127966

(51) Int. Cl.
*G02F 1/1335* (2006.01)
*G02F 1/1343* (2006.01)
(52) U.S. Cl. ........................ 349/109; 349/145
(58) Field of Classification Search .................. 349/106, 349/109, 107, 108, 144, 145
See application file for complete search history.

(56) References Cited

U.S. PATENT DOCUMENTS

| | | | | |
|---|---|---|---|---|
| 2005/0134785 | A1* | 6/2005 | Roth et al. | 349/144 |
| 2006/0072058 | A1* | 4/2006 | Rho | 349/144 |
| 2006/0262251 | A1* | 11/2006 | Kim et al. | 349/106 |
| 2009/0073358 | A1* | 3/2009 | Taguchi et al. | 349/109 |
| 2009/0115952 | A1* | 5/2009 | Nakamura et al. | 349/143 |
| 2009/0141221 | A1* | 6/2009 | Taguchi et al. | 349/109 |

* cited by examiner

*Primary Examiner* — Edward Glick
*Assistant Examiner* — Dennis Y Kim
(74) *Attorney, Agent, or Firm* — Birch, Stewart, Kolasch & Birch, LLP

(57) ABSTRACT

An LCD device is discussed, which comprises first and second substrates confronting each other; a liquid crystal layer between the first and second substrates; and red, green, blue, and fourth color filters on the first substrate; wherein the fourth color filter is formed of any color whose transparency is better than that of at least one of the red, green, and blue color filters, and wherein an effective area of the fourth color filter is smaller than that of at least one of the red, green, and blue color filters. The LCD device can display white color with good transparency by properly adjusting the effective areas of the four color filters, whereby there is no need to modulate light for display of the white color in a backlight unit, to thereby improve luminance of light emitted from the backlight unit.

3 Claims, 8 Drawing Sheets

LIQUID CRYSTAL DISPLAY DEVICE

CROSS REFERENCE TO RELATED APPLICATIONS

This application claims the benefit of the Korean Patent Application No. 10-2009-0127966 filed on Dec. 21, 2009, which is hereby incorporated by reference as if fully set forth herein.

BACKGROUND OF THE INVENTION

1. Field of the Invention

The present invention relates to a liquid crystal display (LCD) device, and more particularly, to an LCD device with improved luminance.

2. Discussion of the Related Art

An LCD device can realize low power consumption owing to a low driving voltage, and the LCD device is suitable for a portable. In this respect, the LCD device is widely used in various fields of notebook computer, monitor, spacecraft, aircraft, and etc.

The LCD device includes a lower substrate, an upper substrate, and a liquid crystal layer between the lower and upper substrates. In case of the LCD device, an alignment state of liquid crystal molecules in the liquid crystal layer is controlled based on whether or not an electric field is applied thereto, and light transmittance is controlled according to the alignment state of liquid crystal molecules, whereby images are displayed thereon.

Hereinafter, a related art LCD device will be described with reference to the accompanying drawings.

Figure 1:
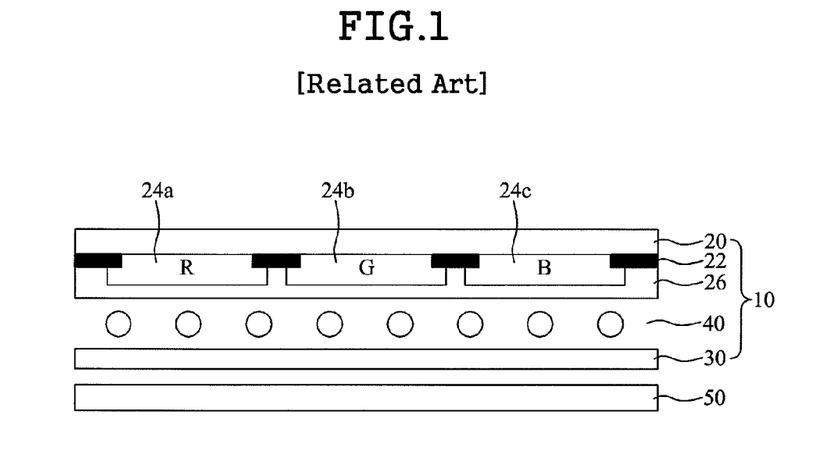
FIG. 1 is a cross section view illustrating a related art LCD device.

FIG. 1 is a cross section view illustrating the related art LCD device.

As shown in FIG. 1, the related art LCD device includes a liquid crystal panel 10 and a backlight unit 50.

The liquid crystal panel 10 includes an upper substrate 20, a lower substrate 30, and a liquid crystal layer 40 between the upper and lower substrates 20 and 30.

On the upper substrate 20, there is a light-shielding layer 22 to prevent light leakage. Then, respective red (R), green (G), and blue (B) color filters 24a, 24b, and 24c are formed between each light-shielding layer 22. A common electrode 26 is formed on the color filters 24a, 24b, and 24c.

Although not shown, a thin film transistor and a pixel electrode are formed on the lower substrate 30, wherein the thin film transistor functions as a switching element, and the pixel electrode is electrically connected to the thin film transistor.

The backlight unit 50 supplies light to the liquid crystal panel 10. The backlight unit 50 is positioned under the liquid crystal panel 10. Although not shown, the backlight unit 50 includes a light source and various elements, for example, light-guiding plate and diffusion sheets to provide light supplied from the light source to the liquid crystal panel 10, uniformly.

In the related art LCD device, an alignment state of liquid crystal molecules in the liquid crystal layer 40 is controlled based on whether or not an electric field is applied thereto, and light transmittance is controlled according to the alignment state of liquid crystal molecules, whereby images are displayed thereon. Especially, various colors can be displayed according as light passes through the red (R), green (G), and blue (B) color filters 24a, 24b, and 24c.

However, some of the light supplied from the backlight unit 50 is used to display the images on the related art LCD device, and a lot of the light supplied from the backlight unit 50 is lost. That is, the related art LCD device has a problem of low luminance caused by the low light transmittance.

The light transmittance in the related art LCD device might be lowered by various causes. Thus, there are continuous researches and studies for finding out the causes of low light transmittance, and overcoming the found causes. A method is to prevent the light transmittance from being lowered by the color filters 24a, 24b, and 24c. That is, the various colors are displayed according as the light supplied from the backlight unit 50 passes through the aforementioned color filters 24a, 24b, and 24c of the liquid crystal panel 10. At this time, a considerable amount of light is absorbed into the color filters 24a, 24b, and 24c, and some of the light is used to display the images.

The color filters 24a, 24b, and 24c are necessary for realization of the various colors. However, the light transmittance is lowered due to the color filters 24a, 24b, and 24c. Thus, a spectral apparatus is used to divide the light supplied from the backlight unit 50 into red (R), green (G), and blue (B) colors, and to supply them to the liquid crystal panel 10. This method enables to display the various colors without using the color filters. Even though the method using the spectral apparatus improves the luminance property by preventing the light transmittance from being lowered, desired colors cannot be realized due to difficulties in process, to thereby lower picture quality.

Thus, it is necessary to study and develop a method for minimizing the lowering of light transmittance by the color filters under the circumstance that the three color filter of red (R), green (G), and blue (B) color filters 24a, 24b, and 24c are used in the LCD device.

SUMMARY OF THE INVENTION

Accordingly, the present invention is directed to an LCD device that substantially obviates one or more problems due to limitations and disadvantages of the related art.

An advantage of the present invention is to provide an LCD device which facilitates to improve light transmittance and to realize various colors by additionally providing a fourth color filter in addition to red (R), green (G), and blue (B) color filters.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, there is provided an LCD device comprising: first and second substrates confronting each other; a liquid crystal layer between the first and second substrates; and red, green, blue, and fourth color filters on the first substrate; wherein the fourth color filter is formed of any color whose transparency is better than that of at least one of the red, green, and blue color filters, and wherein an effective area of the fourth color filter is smaller than that of at least one of the red, green, and blue color filters.

The color filter whose effective area is larger than that of the fourth color filter has a complementary color to a color of the fourth color filter.

The fourth color filter is a yellow color filter.

The yellow color filter uses a yellow color on a straight line connecting red and green from color coordinates.

The effective area of the yellow color filter may be smaller than the effective area of the blue color filter. In this case, the effective area of each of the red and green color filters is larger than the effective area of the yellow color filter, and is smaller than the effective area of the blue color filter; and a size of the effective area of the red color filter is the same as a size of the effective area of the green color filter. Or, a size of the effective area of the red color filter is the same as a size of the effective area of the yellow color filter; and a size of the effective area of the green color filter is the same as a size of the effective area of the blue color filter. Or, a size of the effective area of the red color filter is the same as a size of the effective area of the blue color filter; and a size of the effective area of the green color filter is the same as a size of the effective area of the yellow color filter. At this time, a ratio of the effective area of the yellow color filter to the effective area of the blue color filter is 0.6~0.8:1.2~1.4.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the exemplary embodiments of the present invention, examples of which are illustrated in the accompanying drawings. Wherever possible, the same reference numbers will be used throughout the drawings to refer to the same or like parts.

Hereinafter, an LCD device according to the present invention will be described with reference to the accompanying drawings.

Figure 2:
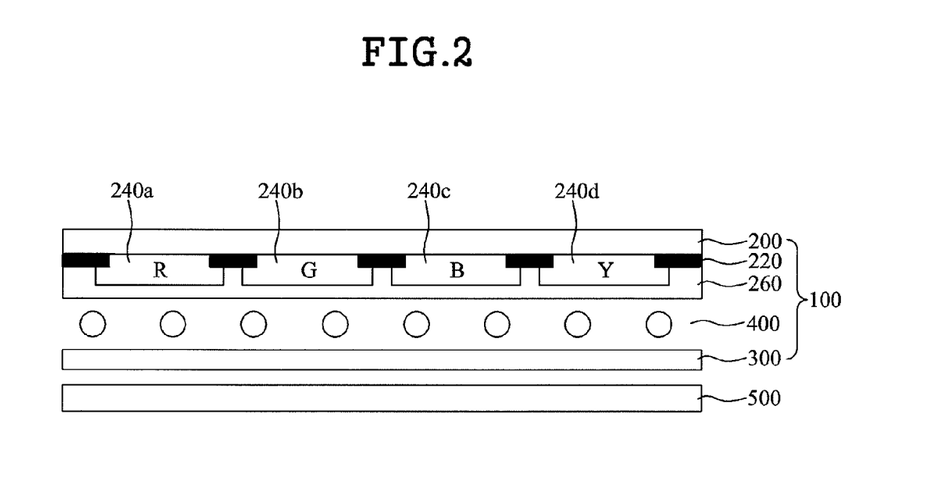
FIG. 2 is a cross section view illustrating an LCD device according to one embodiment of the present invention.

FIG. 2 is a cross section view illustrating an LCD device according to one embodiment of the present invention.

As shown in FIG. 2, the LCD device according to one embodiment of the present invention includes a liquid crystal panel 100 and a backlight unit 500.

The liquid crystal panel 100 includes a first substrate 200, a second substrate 300, and a liquid crystal layer 400 between the first and second substrates 200 and 300.

A light-shielding layer 220 for preventing light leakage is formed on the first substrate 200. Then, red (R), green (G), blue (B), and yellow (Y) color filters 240a, 240b, 240c, and 240d are respectively formed between each light-shielding layer 220. A common electrode 260 is formed on the aforementioned red (R), green (G), blue (B), and yellow (Y) color filters 240a, 240b, 240c, and 240d.

Although not shown, a thin film transistor and a pixel electrode are formed on the second substrate 300. The thin film transistor functions as a switching element, and the pixel electrode is connected to the thin film transistor.

In case of In-Plane Switching (IPS) mode, instead of forming the common electrode 260 on the first substrate 200, both the common electrode and pixel electrode are formed on the second substrate 300 so as to control an alignment state of liquid crystal molecules in the liquid crystal layer 400 by an electric filed generated in a plane parallel to the substrates.

The LCD device according to the present invention uses the red (R), green (G), blue (B), and yellow (Y) color filters 240a, 240b, 240c, and 240d. Thus, as compared to the related art LCD device using only red (R), green (G), and blue (B) color filters, the LCD device according to the present invention can realize more-improved light transmittance.

That is, light transmittance of the yellow (Y) color filter 240d is better than light transmittance of each of the red (R), green (G), and blue (B) color filters 240a, 240b, and 240c. Thus, if additionally providing the yellow (Y) color filter 240d, the total light transmittance can be improved. However, if applying 4-primary color, the additionally-provided color filter is not limited to the yellow (Y) color filter 240d. That is, any color filter whose light transmittance is better than that of at least one among the red (R), green (G), and blue (B) color filters can be used as the fourth color filter (hereinafter, referred to as 'fourth color filter') in consideration for improvement of light transmittance.

For improving efficiency of light transmittance when applying the yellow (Y) color filter 240d, it is preferable to use the yellow (Y) color on a straight line connecting the red (R) and the green (G).

Figure 3:
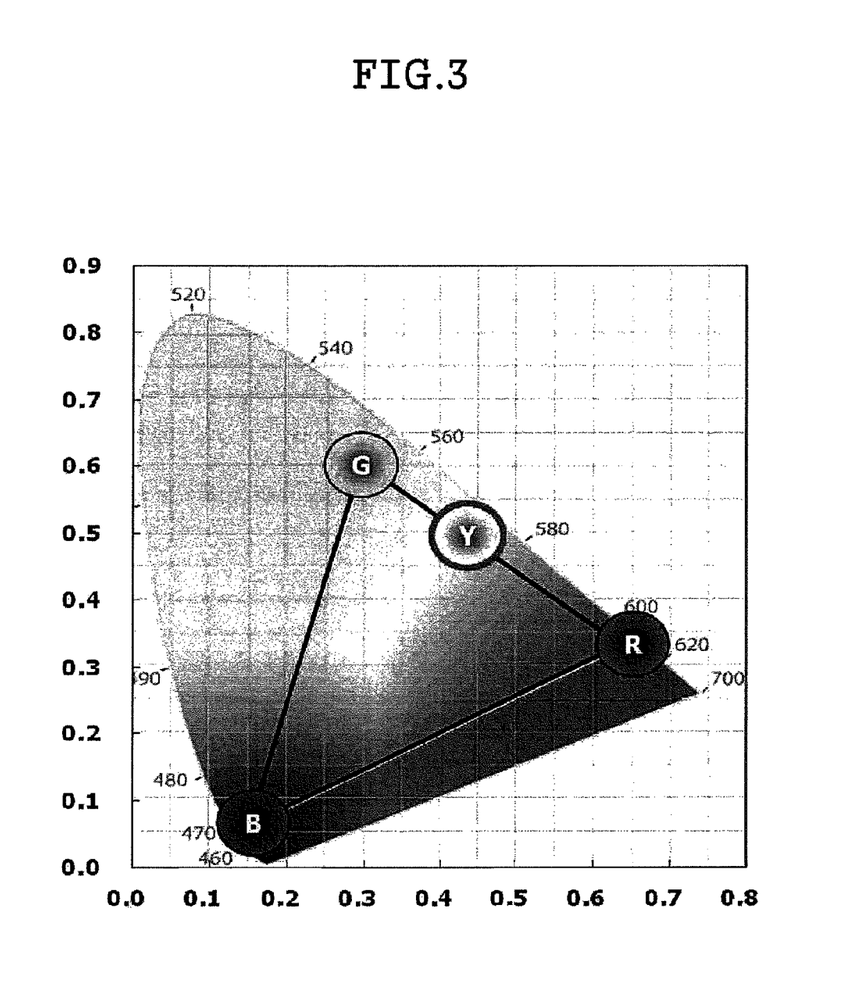
FIG. 3 illustrates color coordinates to show a yellow (Y) color used as a fourth color filter in an LCD device according to the present invention.

FIG. 3 illustrates color coordinates to show the yellow (Y) color used as the fourth color filter according to the present invention. According to the present invention, the fourth color filter may be formed of the yellow (Y) color on the straight line connecting the red (R) and the green (G).

A light transmittance of the yellow (Y) color is better than that in each of the other three color filters. If considering only improvement of the light transmittance, it is profitable to use the yellow (Y) color inside the straight line connecting the red (R) and the green (G) from the color coordinates of FIG. 3, that is, the brighter yellow color, but which might cause lowering of color realization. In order to improve the color realization, it is profitable to use the yellow (Y) color outside the straight line connecting the red (R) and the green (G) from the color coordinates of FIG. 3, that is, the darker yellow color, but which might cause lowering of light transmittance due to the increased color density. In consideration for both the light transmittance and the color realization, it is preferable to use the yellow (Y) color on the straight line connecting the red (R) and the green (G) from the color coordinates of FIG. 3.

If additionally providing the yellow (Y) color in addition to the red (R), green (G), and blue (B) color filters, the light transmittance can be improved. However, white color coordinates may be shifted due to the additionally-provided yellow (Y) color filter.

Figure 4:
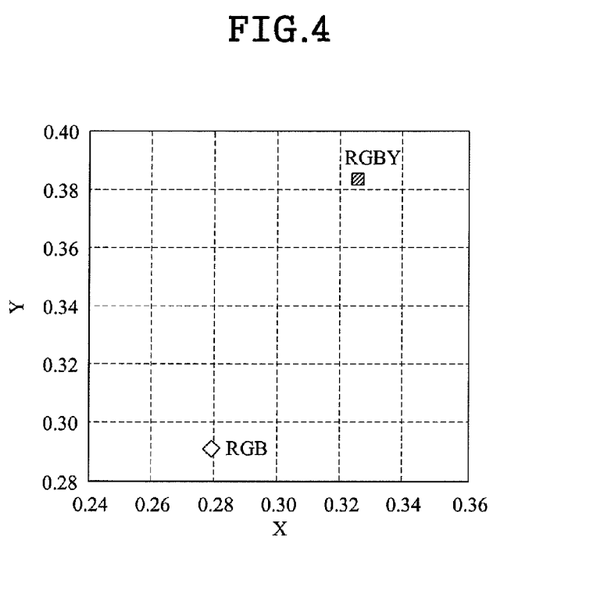
FIG. 4 illustrates white color coordinates when using three colors of red (R), green (G), and blue (B); and illustrates white color coordinates when using four colors of red (R), green (G), blue (B), and yellow (Y)

FIG. 4 illustrates the white color coordinates when using the three colors of red (R), green (G), and blue (B); and illustrates the white color coordinates when using the four colors of red (R), green (G), blue (B), and yellow (Y).

As shown in FIG. 4, if using the four colors, the white color coordinates are shifted rightward, as compared to the case using the three colors. Thus, transparency of the white color displayed when using the four colors is relatively lower than transparency of the white color displayed when using the three colors, that is, the yellowish white color is displayed when using the four colors, to thereby deteriorate picture quality.

For using the four colors and simultaneously displaying the white color with good transparency, it is preferable to modulate light emitted from the backlight unit 500.

As mentioned above, the yellowish white color is displayed when using the four colors. Thus, the light emitted from the backlight unit 500 has to be modulated to be blue-colored light which is complementary to the yellowish-colored light. According as the modulated light of blue-colored light is supplied to the liquid crystal panel 100, the virtual image can be displayed with the white color of good transparency.

However, if the backlight unit 500 emits the blue-colored light, the luminance is lowered.

Figure 5:
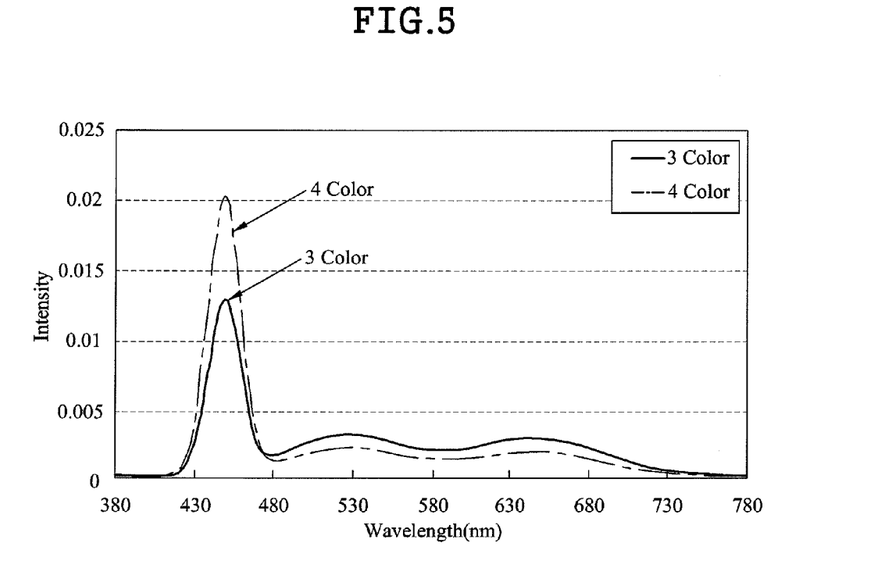
FIG. 5 is a graph illustrating luminance according to a wavelength of light emitted from a backlight unit.

FIG. 5 is a graph illustrating luminance according to a wavelength of light emitted from the backlight unit. As shown in FIG. 5, in case of the light shifted to the blue color so as to use the four colors, its luminance is increased in a short wavelength, but is decreased in other wavelengths except the short wavelength, as compared to the light so as to use the three colors.

The reason for using the four colors is to improve the luminance property by enhancing the light transmittance. If using the light shifted to the blue color so as to prevent the deterioration of picture quality, the luminance property is lowered so that it is difficult to realize desired improvement of the luminance property.

If considering all of the aforementioned factors, a preferable method for preventing deterioration of the picture quality and realizing desired improvement of the luminance property is to design different effective areas for the respective red (R), green (G), blue (B), and yellow (Y) color filters when using the four color filters. This method enables to display the white color with good transparency instead of the yellowish white color. That is, there is no need to modulate the light emitted from the backlight unit 500, that is, to use the light shifted to the blue color.

FIGS. 6A to 6D are layouts of first substrates 200 illustrating optimized effective areas of red (R), green (G), blue (B), and yellow (Y) color filters according to the various embodiments of the present invention, each of which illustrates a quad-type pixel.

As shown in FIGS. 6A to 6D, according to one embodiment of the present invention, the light-shielding layer 220 is formed on the first substrate 200. Then, the red (R) color filter 240a, the green (G) color filter 240b, the blue (B) color filter 240c, and the yellow (Y) color filter 240d are respectively formed between each light-shielding layer 220.

Among the respective effective areas of the four color filters, the effective area of the blue (B) color filter 240c is largest; the effective area of the yellow (Y) color filter 240d is smallest; and the effective area of each of the red (R) color filter 240a and the green (G) color filter 240b is middle-sized. Also, the effective area of the red (R) color filter 240a is identical in size to the effective area of the green (G) color filter 240b.

That is, as shown in FIGS. 6A to 6D, the effective areas are designed in such a way that the effective area of the blue (B) color filter>the effective area of the red (R) color filter=the effective area of the green (G) color filter>the effective area of the yellow (Y) color filter. At this time, the effective area of each color filter indicates an area for realizing the specific color between each light-shielding layer 220.

According to FIGS. 6A to 6D, the effective area of the yellow (Y) color filter 240d used as the fourth color filter is relatively small, and the effective area of the blue (B) color filter 240c which is complementary to the yellow color is relatively large, so that it is possible to use the four colors and simultaneously to display the white color with good transparency.

Especially, for displaying the white color with good transparency, on assumption that the effective area of each of the red (R) color filter 240a and the green (G) color filter 240b is '1', the effective area of the yellow (Y) color filter 240d is '0.6~0.8'; and the effective area of the blue (B) color filter 240c is '1.2~1.4', preferably. If it is outside the aforementioned range, it might be difficult to display the white color with good transparency.

There is no specific arranging order of the red (R) color filter 240a, green (G) color filter 240b, blue (B) color filter 240c, and yellow (Y) color filter 240d. Preferably, when sub-pixels of the four color filters constitute one pixel, the arrangement of the four color filters is controlled so as to form the quad-shaped pixel.

Figure 6A:
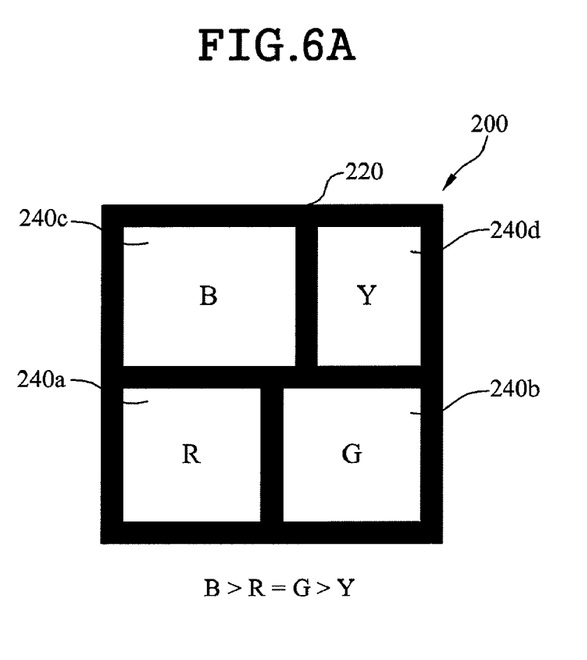
FIGS. 6A to 6D are layouts of first substrates illustrating optimized effective areas of red (R), green (G), blue (B), and yellow (Y) color filters according to the various embodiments of the present invention.
Figure 6B:
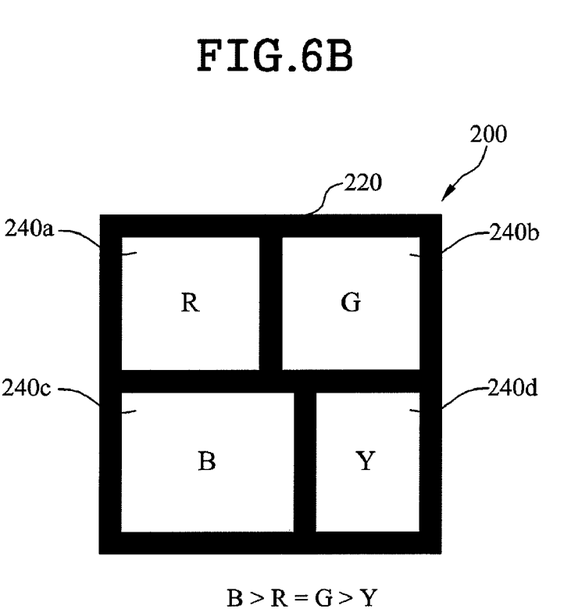
Figure 6C:
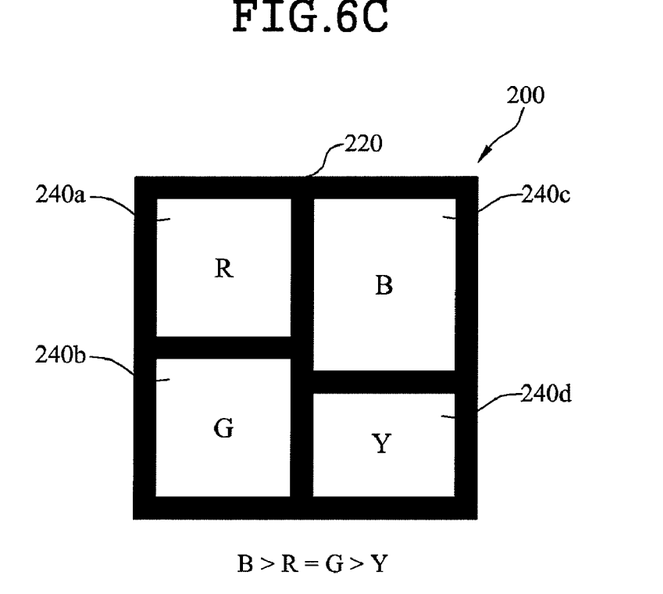
Figure 6D:
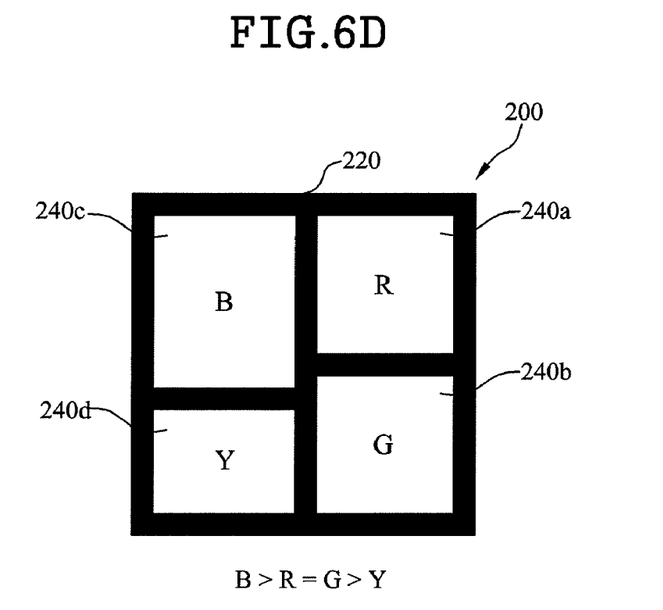

In order to form the quad-shaped pixel, the one pixel may be divided into lower and upper parts. Then, as shown in FIG. 6A, the blue (B) and yellow (Y) color filters 240c and 240d may be arranged in the upper part of the pixel; and the red (R) and green (G) color filters 240a and 240b may be arranged in the lower part of the pixel. As shown in FIG. 6B, the blue (B) and yellow (Y) color filters 240c and 240d may be arranged in the lower part of the pixel; and the red (R) and green (G) color filters 240a and 240b may be arranged in the upper part of the pixel. In order to form the quad-shaped pixel, the one pixel may be divided into left and right parts. Then, as shown in FIG. 6C, the red (R) and green (G) color filters 240a and 240b may be arranged in the left part of the pixel; and the blue (B) and yellow (Y) color filters 240c and 240d may be arranged in the right part of the pixel. As shown in FIG. 6D, the red (R) and green (G) color filters 240a and 240b may be arranged in the right part of the pixel; and the blue (B) and yellow (Y) color filters 240c and 240d may be arranged in the left part of the pixel.

Figure 7:
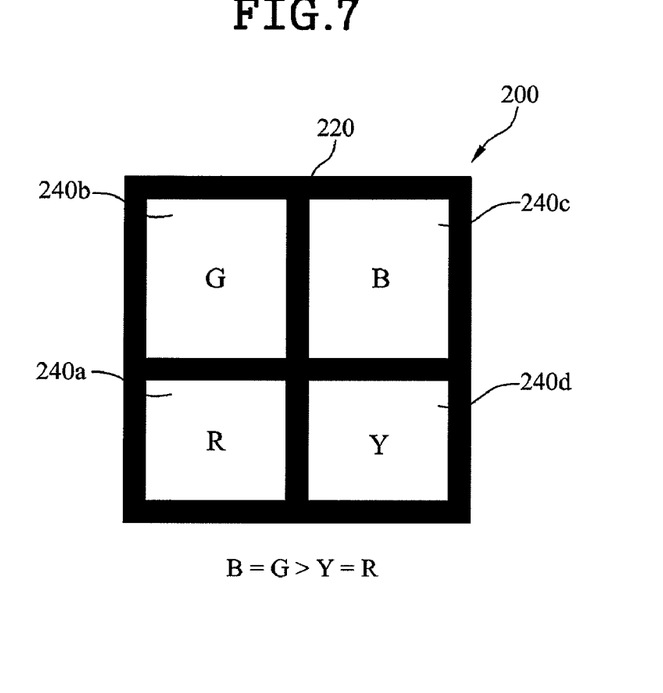
FIGS. 7 to 11 are layouts of first substrates illustrating optimized effective areas of red (R), green (G), blue (B), and yellow (Y) color filters according to the other embodiments of the present invention.
Figure 8:
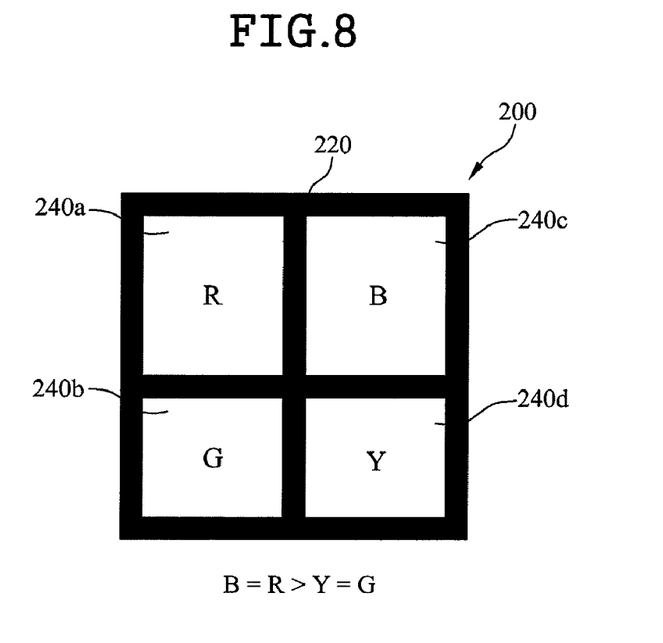

FIGS. 7 and 8 illustrate layouts of the first substrate 200 with the optimized effective areas of the respective red (R), green (G), blue (B), and yellow (Y) color filters, each of which illustrates a quad-type pixel.

According to an embodiment of the present invention in FIG. 7, a size of the effective area for the blue (B) color filter 240c is the same as a size of the effective area of the green (G) color filter 240b; and a size of the effective area of the yellow (Y) color filter 240d is the same as a size of the effective area of the red (R) color filter 240a; wherein the size of the effective area in each of the blue (B) and green (G) color filters 240c and 240b is relatively larger than the size of the effective area in each of the yellow (Y) and red (R) color filters 240d and 240a.

That is, as shown in FIG. 7, the effective areas of the four color filters are designed in such a way that the effective area of the blue (B) color filter=the effective area of the green (G) color filter>the effective area of the yellow (Y) color filter=the effective area of the red (R) color filter. Preferably, a ratio of the effective areas of the blue (B) and green (G) color filters 240c and 240b to the effective areas of the yellow (Y) and red (R) color filters 240d and 240a is '1.2~1.4:0.6~0.8', to thereby display the white color with good transparency.

According to another embodiment of the present invention in FIG. 8, a size of the effective area for the blue (B) color filter 240c is the same as a size of the effective area of the red (R) color filter 240a; and a size of the effective area of the yellow (Y) color filter 240d is the same as a size of the effective area of the green (G) color filter 240b; wherein the size of the effective area in each of the blue (B) and red (R) color filters 240c and 240a is relatively larger than the size of the effective area in each of the yellow (Y) and green (G) color filters 240d and 240b.

That is, as shown in FIG. 8, the effective areas of the four color filters are designed in such a way that the effective area of the blue (B) color filter=the effective area of the red (R) color filter>the effective area of the yellow (Y) color filter=the effective area of the green (G) color filter. Preferably, a ratio of the effective areas of the blue (B) and red (R) color filters 240c and 240a to the effective areas of the yellow (Y) and green (G) color filters 240d and 240b is '1.2~1.4: 0.6~0.8', to thereby display the white color with good transparency.

The aforementioned embodiment of FIG. 6A may be modified to have the various examples shown in FIGS. 6B to 6D. In the same manner as described in FIGS. 6A to 6D, the aforementioned embodiments of FIGS. 7 and 8 may be modified to have the various examples, which will be described in detail as follows.

Figure 9:
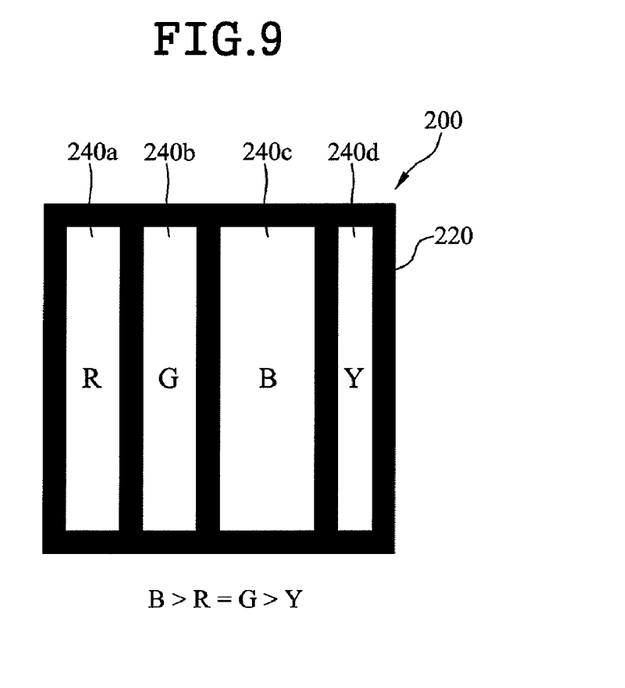
Figure 10:
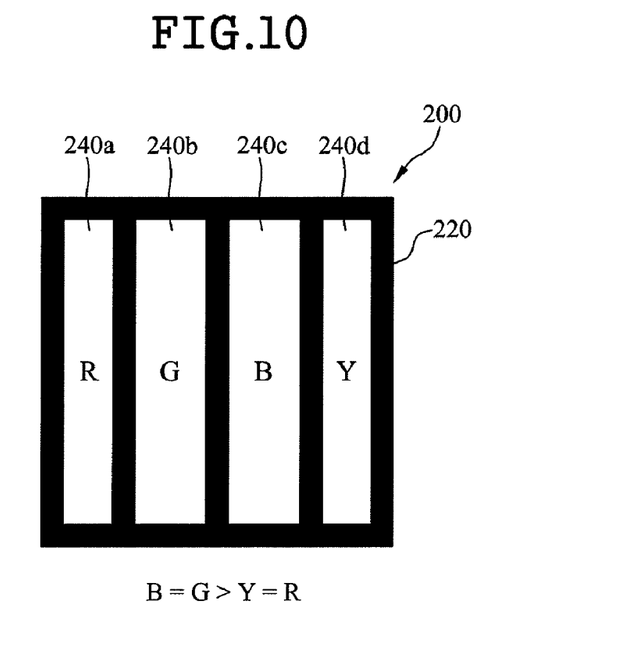
Figure 11:
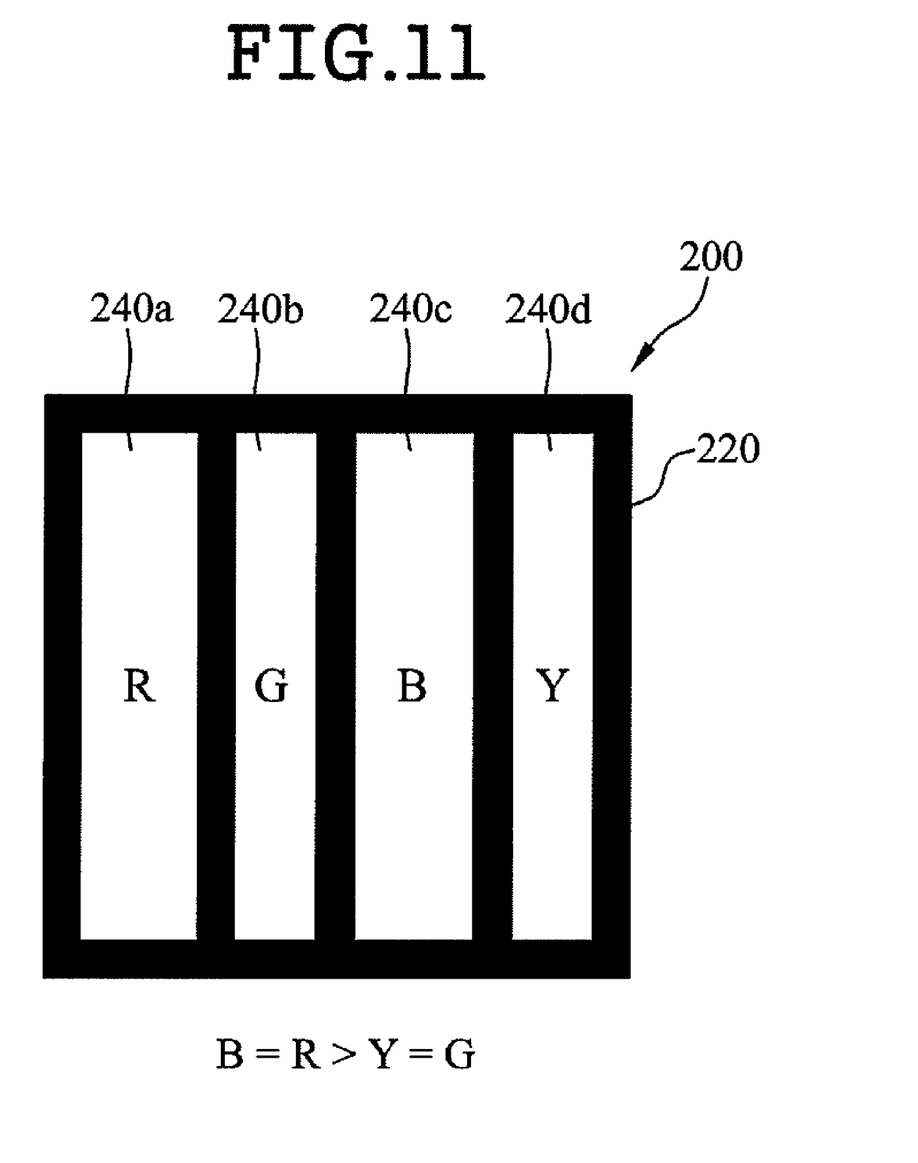

FIGS. 9 to 11 are layouts of the first substrate 200 with the optimized effective areas of the respective red (R), green (G), blue (B), and yellow (Y) color filters, each of which illustrates a stripe-type pixel.

According to one embodiment of the present invention in FIG. 9, among the effective areas of the red (R), green (G), blue (B), and yellow (Y) color filters 240a, 240b, 240c, and 240d, the effective area of the blue (B) color filter 240c is largest; the effective area of the yellow (Y) color filter 240d is smallest; and the effective area of each of the red (R) and green (G) color filters 240a and 240b is middle-sized. Also, the effective area of the red (R) color filter 240a is identical in size to the effective area of the green (G) color filter 240b.

That is, as shown in FIG. 9, the effective areas of the four color filters are designed in such a way that the effective area of the blue (B) color filter>the effective area of the red (R) color filter=the effective area of the green (G) color filter>the effective area of the yellow (Y) color filter. Preferably, on assumption that the effective area of each of the red (R) color filter 240a and the green (G) color filter 240b is '1', the effective area of the yellow (Y) color filter 240d is '0.6~0.8'; and the effective area of the blue (B) color filter 240c is '1.2~1.4', to thereby display the white color with good transparency.

According to another embodiment of the present invention in FIG. 10, a size of the effective area for the blue (B) color filter 240c is the same as a size of the effective area of the green (G) color filter 240b; and a size of the effective area of the yellow (Y) color filter 240d is the same as a size of the effective area of the red (R) color filter 240a; wherein the size of the effective area in each of the blue (B) and green (G) color filters 240c and 240b is relatively larger than the size of the effective area in each of the yellow (Y) and red (R) color filters 240d and 240a.

That is, as shown in FIG. 10, the effective areas of the four color filters are designed in such a way that the effective area of the blue (B) color filter=the effective area of the green (G) color filter>the effective area of the yellow (Y) color filter=the effective area of the red (R) color filter. Preferably, a ratio of the effective areas of the blue (B) and green (G) color filters 240c and 240b to the effective areas of the yellow (Y) and red (R) color filters 240d and 240a is '1.2~1.4:0.6~0.8', to thereby display the white color with good transparency.

According to another embodiment of the present invention in FIG. 11, a size of the effective area for the blue (B) color filter 240c is the same as a size of the effective area of the red (R) color filter 240a; and a size of the effective area of the yellow (Y) color filter 240d is the same as a size of the effective area of the green (G) color filter 240b; wherein the size of the effective area in each of the blue (B) and red (R) color filters 240c and 240a is relatively larger than the size of the effective area in each of the yellow (Y) and green (G) color filters 240d and 240b.

That is, as shown in FIG. 11, the effective areas of the four color filters are designed in such a way that the effective area of the blue (B) color filter=the effective area of the red (R) color filter>the effective area of the yellow (Y) color filter=the effective area of the green (G) color filter. Preferably, a ratio of the effective areas of the blue (B) and red (R) color filters 240c and 240a to the effective areas of the yellow (Y) and green (G) color filters 240d and 240b is '1.2~1.4: 0.6~0.8', to thereby display the white color with good transparency.

In the stripe-type pixels shown in FIGS. 9 to 11, the arranging order of the color filters may be changed in various ways. Preferably, when sub-pixels of the four color filters constitute one pixel, the one pixel is formed in the quad shape by arranging the four color filters. That is, the respective effective areas of the four color filters are adjusted in width under the circumstance that each of the four color filters has the same length, to thereby obtain the quad-shaped pixel.

Among the layouts of the first substrates 200 according to the various embodiments of the present invention, FIG. 7 illustrates that the ratio of the effective areas of the blue (B) and green (G) color filters 240c and 240b to the effective areas of the yellow (Y) and red (R) color filters 240d and 240a is '1.3:0.7'. This embodiment of FIG. 7 enables to display the white color with good transparency, and also to raise about 25% of luminance efficiency as compared to the related art using the three color filters, as known from a simulation result.

As shown in FIG. 8, when the ratio of the effective areas of the blue (B) and red (R) color filters 240c and 240a to the effective areas of the yellow (Y) and green (G) color filters 240d and 240b is '1.3:0.7', the white color with good transparency can be displayed, and also the luminance efficiency can be raised about 20% as compared to the related art using the three color filters, as known from a simulation result.

As mentioned above, the LCD device according to the present invention includes the additional fourth color filter 240d as well as the three color filters of red (R), green (G), and blue (B) color filters 240a, 240b, and 240c, whereby the luminance property can be improved therein. Also, the white color with good transparency can be displayed by properly adjusting the effective areas of the respective four color filters 240a, 240b, 240c, and 240d. Since the white color with good transparency is displayed through the use of four color filters 240a, 240b, 240c, and 240d, there is no need to modulate the light for display of the white color in the backlight unit 500, to thereby improve the luminance of light emitted from the backlight unit 500. Eventually, the LCD device according to the present invention can improve the luminance property, and simultaneously display the images with good picture quality.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. An LCD device comprising:

first and second substrates confronting each other;

a liquid crystal layer between the first and second substrates; and red, green, blue, and fourth color filters on the first substrate;

wherein the fourth color filter is formed of any color whose transparency is better than that of at least one of the red, green, and blue color filters, wherein an effective area of the fourth color filter is smaller than that of at least one of the red, green, and blue color filters wherein the fourth color filter is a yellow color filter, wherein the effective area of the yellow color filter is smaller than the effective area of the blue color filter, wherein a size of the effective area of the red color filter is the same as a size of the effective area of the yellow color filter, and wherein a size of the effective area of the green color filter is the same as a size of the effective area of the blue color filter.

2. The LCD device according to claim 1, wherein the yellow color filter uses a yellow color on a straight line connecting red and green from color coordinates.

3. The LCD device according to claim 1, wherein a ratio of the effective area of the yellow color filter to the effective area of the blue color filter is '0.6~0.8:1.2~1.4'.

* * * * *